United States Patent
Fukushima

(10) Patent No.: US 11,650,218 B2
(45) Date of Patent: May 16, 2023

(54) AUTOMATIC SAMPLE INJECTION SYSTEM

(71) Applicant: SHIMADZU CORPORATION, Kyoto (JP)

(72) Inventor: Daiki Fukushima, Kyoto (JP)

(73) Assignee: SHIMADZU CORPORATION, Kyoto (JP)

(\*) Notice: Subject to any disclaimer, the term of this patent is extended or adjusted under 35 U.S.C. 154(b) by 98 days.

(21) Appl. No.: 17/471,482

(22) Filed: Sep. 10, 2021

(65) Prior Publication Data

US 2022/0120776 A1    Apr. 21, 2022

(30) Foreign Application Priority Data

Oct. 16, 2020    (JP) .............................. JP2020-174370

(51) Int. Cl.
| | | |
|---|---|---|
| *C12N 15/10* | (2006.01) | |
| *B01L 3/00* | (2006.01) | |
| *B01L 7/00* | (2006.01) | |
| *F28F 3/12* | (2006.01) | |
| *G01N 35/10* | (2006.01) | |

(52) U.S. Cl.
CPC ...... *G01N 35/1081* (2013.01); *B01L 3/50855* (2013.01); *B01L 2300/08* (2013.01)

(58) Field of Classification Search
CPC ............... G01N 35/1081; G01N 30/24; G01N 35/1095; G01N 35/04; G01N 2035/0441; G01N 2035/0465; G01N 2035/0493; B01L 3/50855; B01L 2300/08
See application file for complete search history.

(56) References Cited

U.S. PATENT DOCUMENTS

2007/0196236 A1\*  8/2007  Richter .............. G01N 35/1095
                                                      422/64

FOREIGN PATENT DOCUMENTS

JP          09-325153 A      12/1997

\* cited by examiner

*Primary Examiner* — Jennifer Wecker
*Assistant Examiner* — Oyeleye Alexander Alabi
(74) *Attorney, Agent, or Firm* — Sughrue Mion, PLLC

(57) ABSTRACT

An automatic sample injection system (1) includes at least an injector (2). The injector (2) includes a turret (10) comprising a plurality of vial receiving holes (30) that are corresponding to a plurality of types of vials having different sizes, the plurality of vial receiving holes (30) being provided on the same circumference on an upper surface of the turret, the turret being configured to rotate so that the plurality of the vial receiving holes (30) are each moved along a circumferential track, and a controller (22) configured, in a case where a sampler (4) for supplying a vial to the injector (2) is provided, to recognize a size of a target vial to be supplied at the time when the target vial is supplied from the sampler (4) and to arrange the vial receiving hole (30) corresponding to the target vial at a delivery position (P) set on the circumferential track.

5 Claims, 5 Drawing Sheets

RACK FOR
A SMALL-SIZED VIAL

RACK FOR
A LARGE-SIZED VIAL

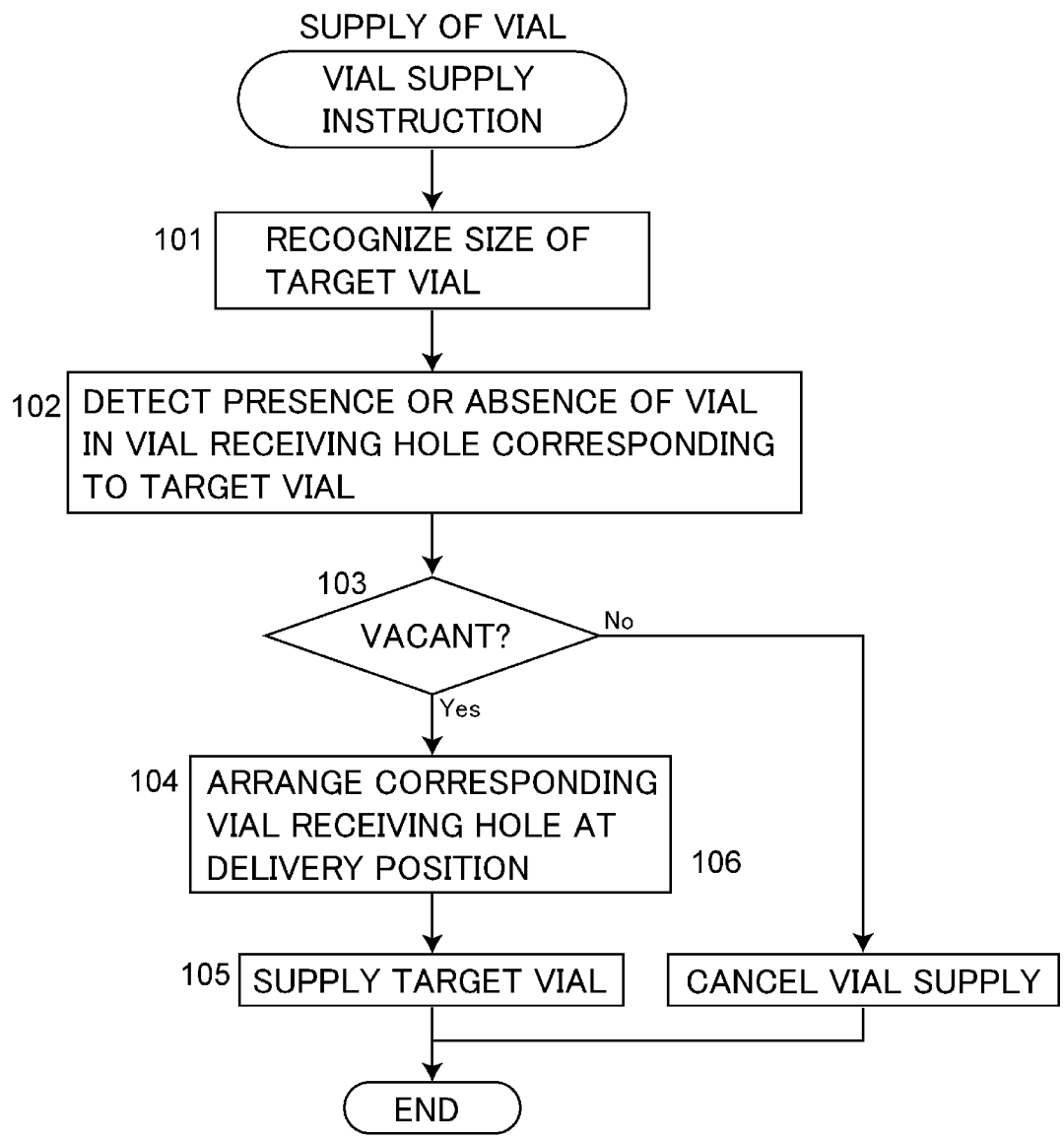

AUTOMATIC SAMPLE INJECTION SYSTEM

BACKGROUND OF THE INVENTION

1. Field of the Invention

The present invention relates to an automatic sample injection system for gas chromatography analysis.

2. Description of the Related Art

An automatic sample injection device (hereinafter, referred to as an injector) that automatically injects a sample into a gas chromatography analysis device is known (see Japanese Patent Laid-open Publication No. 9-325153). The injector includes a movable turret in which a plurality of vials containing a sample are set, and a syringe for sucking the sample from the vial set in the turret. When a sample is injected into a gas chromatograph, a vial containing a target sample is arranged at a predetermined position by movement of the turret, and the sample of the vial arranged at the predetermined position is sucked by the syringe and injected into the analysis device.

Further, there is a limit to the number of vials that can be set in the turret of the injector, and when the number of samples is large, not all samples can be set in the injector. For this reason, a sampler that supplies a vial containing a sample to the injector may be used together with the injector. In that case, the turret of the injector is provided with a vial receiving hole for receiving and holding a vial supplied from the sampler.

There are a plurality of types of vials, and size of the vial varies depending on the type. When the type of a vial to be mounted on a sampler is changed, the type of a vial to be supplied from the sampler to an injector is changed. Therefore, without proper treatment, the size of the vial supplied from the sampler does not match size of a vial receiving hole of a turret, which causes a problem that the vial drops. Therefore, it is necessary to change the size of the vial receiving hole of the turret by replacing the turret or replacing a component of a vial receiving portion of the turret according to the type of the vial supplied from the sampler to the injector. However, when the vial receiving hole of the turret is changed, it is necessary to perform teaching to cause the injector to remember a reference position for accurately positioning the turret at a desired position, which imposes a large work load on the user.

The present invention has been made in view of the above problem, and an object of the present invention is to allow supply of a vial from a sampler to an injector to be performed normally regardless of a type of the vial.

SUMMARY OF THE INVENTION

An automatic sample injection system according to the present invention includes at least an injector that performs sample injection operation to an analysis device. The injector includes a turret comprising a plurality of vial receiving holes that are corresponding to a plurality of types of vials having different sizes and are for receiving the plurality of types of vials, the plurality of vial receiving holes being provided on a same circumference on an upper surface of the turret, the turret being configured to rotate so that the plurality of vial receiving holes are each moved along a circumferential track, and a controller that controls operation of the turret, the controller being configured, in a case where a sampler for supplying a vial to the injector is provided, to recognize a size of a target vial to be supplied at the time when the target vial is supplied from the sampler to the injector and to arrange the vial receiving hole corresponding to the target vial at a delivery position set on the circumferential track.

According to the automatic sample injection system according to the present invention, the turret of the injector is provided with a plurality of the vial receiving holes corresponding to a plurality of types of vials, and when a vial is supplied from the sampler to the injector, the vial receiving hole corresponding to the vial to be supplied is arranged at a predetermined delivery position. Accordingly, supply of a vial from the sampler to the injector is performed normally regardless of a type of the vial supplied from the sampler to the injector.

BRIEF DESCRIPTION OF THE DRAWINGS

FIG. 6 is a flowchart illustrating an example of operation when a vial is supplied from the sampler to the injector in the embodiment.

DETAILED DESCRIPTION OF THE INVENTION

Hereinafter, an embodiment of an automatic sample injection system according to the present invention will be described with reference to the drawings.

Figure 1:
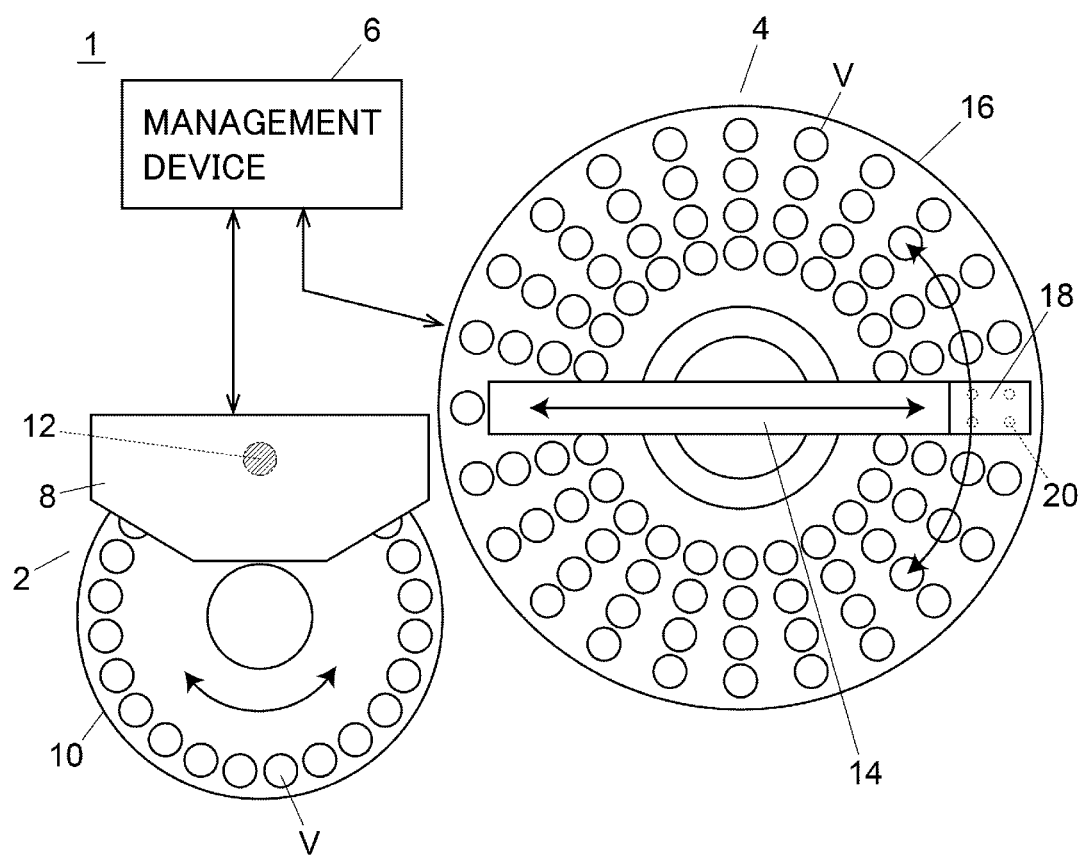
FIG. 1 is a diagram schematically illustrating an embodiment of an automatic sample injection system.

As illustrated in FIG. 1, an automatic sample injection system 1 includes an injector 2, a sampler 4, and a management device 6.

The injector 2 is a device that is arranged on a gas chromatography analysis device and injects a sample into an injection port provided on an upper surface of the gas chromatography analysis device.

The sampler 4 is a device for supplying a vial V containing liquid such as a sample, a solvent, and cleaning liquid to the injector 2 as necessary, and is additionally provided on the side of the injector 2.

The management device 6 is for managing operation of the entire automatic sample injection system 1 including the injector 2 and the sampler 4. The management device 6 may be realized by a general-purpose personal computer or a dedicated computer including a CPU and an information storage device. The user sets an operation condition of the automatic sample injection system 1 on the management device 6.

The injector 2 includes a sampling mechanism 8 and a turret 10. The turret 10 is a circular rotary table rotated by a stepping motor. On an upper surface of the turret 10, a plurality of the vials V are set in a state of being arranged on the same circumference, and the vials V move in a circumferential track as the turret 10 rotates. The sampling mechanism 8 includes a syringe 12. The syringe 12 is provided so as to be movable up and down in a state where a tip for sucking and discharging liquid is directed vertically downward. The turret 10 can place an optional one of the mounted vials V directly under the syringe 12.

The sampler 4 includes a transfer arm 14 and a vial holder 16. The vial holder 16 is a circular table on which a plurality of the vials V to be supplied to the injector 2 can be set. The transfer arm 14 is provided so as to extend in the horizontal direction on the vial holder 16, and a gripper 18 having a plurality of claws 20 for gripping the vial V is provided at a distal end portion of the transfer arm 14. The transfer arm 14 can grip an optional one of the vials V set in the vial holder 16 with the gripper 18 by rotating in a horizontal plane with the center of the vial holder 16 as a rotation center and sliding in the axial direction, and can transfer and supply the vial V to the turret 10 of the injector 2.

Figure 2:
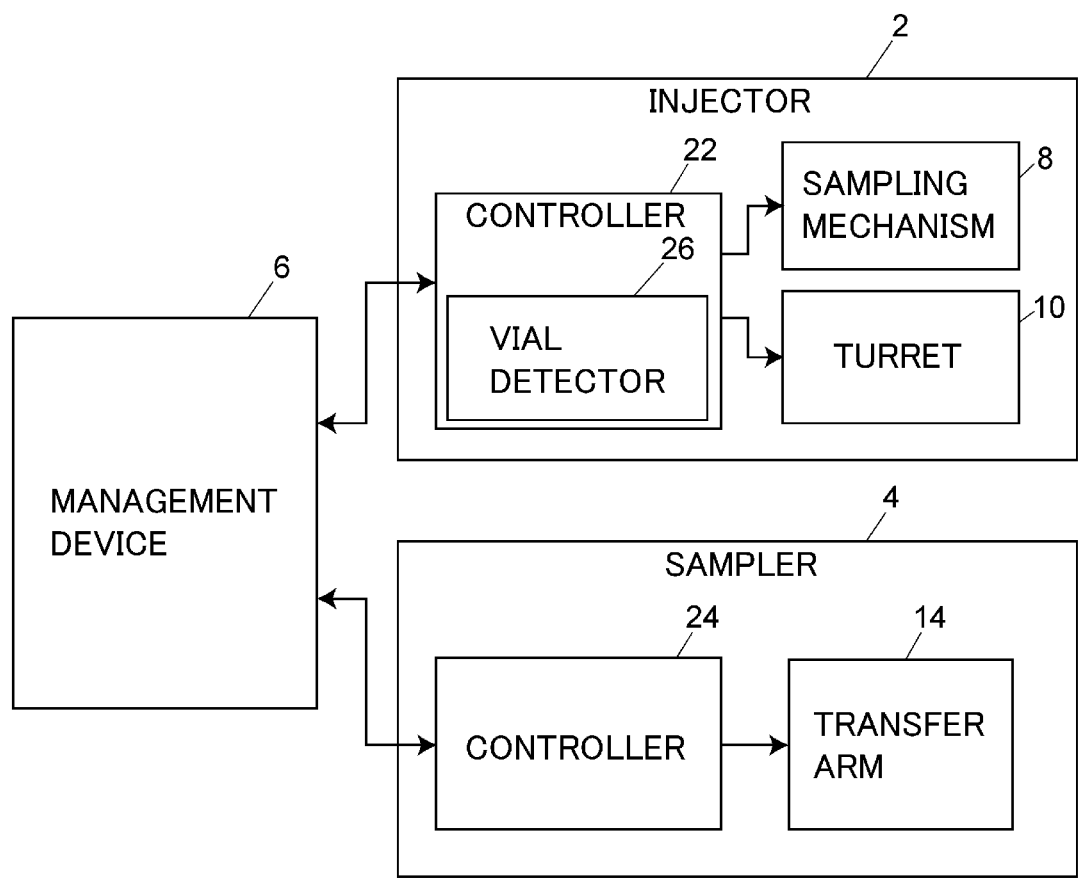
FIG. 2 is a block diagram illustrating an example of a control system of the embodiment.

As illustrated in FIG. 2, the injector 2 and the sampler 4 include controllers 22 and 24, respectively. The controller 22 of the injector 2 controls operation of the sampling mechanism 8 and the turret 10. The controller 24 of the sampler 4 controls operation of the transfer arm 14. The controllers 22 and 24 are implemented by a computer circuit including a CPU, an information storage memory, and the like, and are communicably connected to the management device 6. The management device 6 outputs control information based on an operation condition set by the user to the controllers 22 and 24, and the controllers 22 and 24 perform operation control based on the control information provided from the management device 6.

Figure 3:
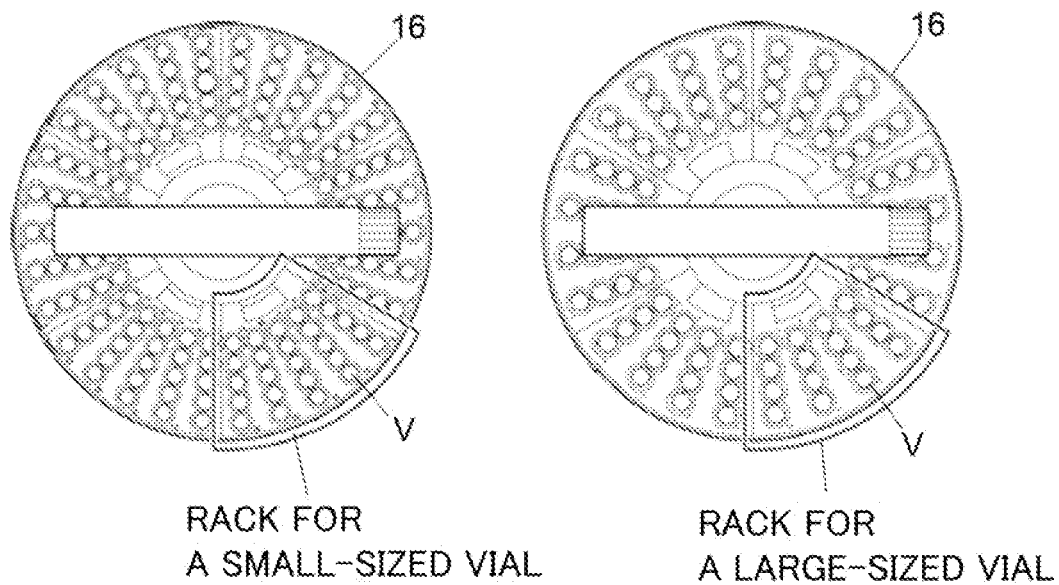
FIG. 3 is a plan view illustrating an example of a type of a vial rack mounted on a sampler.

As illustrated in FIG. 3, a plurality of types of the vials V having different sizes can be set in the vial holder 16 of the sampler 4. Each type of the vial is set in the vial holder 16 in a state of being mounted on a vial rack (also simply referred to as a rack) prepared for each type. In the example of FIG. 3, a state in which the vial V is set in the vial holder 16 using a rack for a small-sized vial and a rack for a large-sized vial larger than the small-sized vial is illustrated. Note that, although FIG. 3 illustrates a state in which the vials V having a uniform size are set on the entire surface of the vial holder 16, the vials V having different sizes can be simultaneously set in the vial holder 16.

The user sets, on the management device 6, what type (size) of a vial is set in the vial holder 16 of the sampler 4, that is, what each vial set in the vial holder 16 is. The management device 6 provides the controller 24 of the sampler 4 with vial information on a vial set in the vial holder 16. The controller 24 of the sampler 4 holds the vial information provided from the management device 6 and controls operation of the transfer arm 14 on the basis of the vial information.

Figure 4:
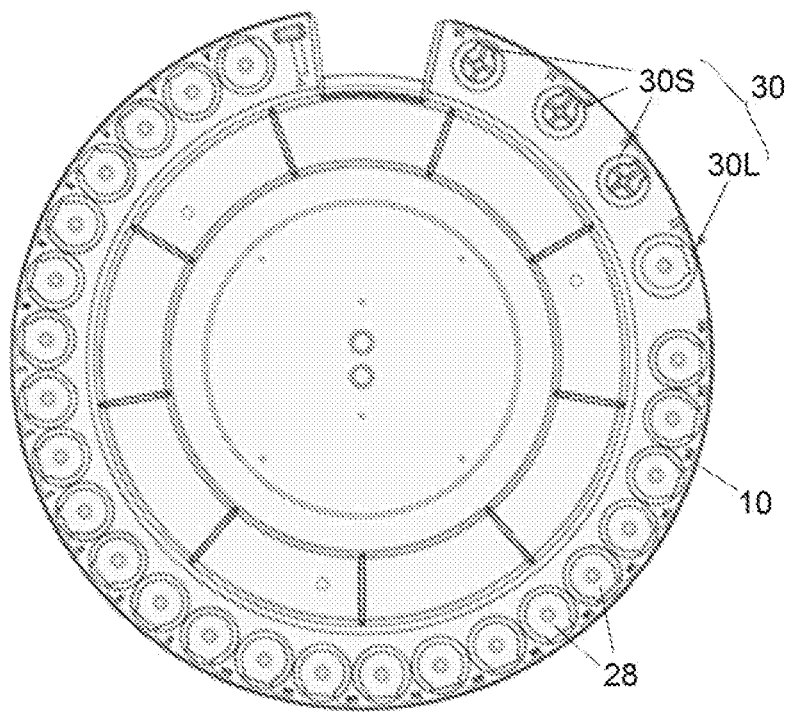
FIG. 4 is a plan view illustrating an example of a turret of the injector.

As shown in FIG. 4, the turret 10 of the injector 2 is provided with a plurality of vial receiving holes 30 for holding a vial supplied from the vial holder 16 of the sampler 4, apart from a vial receiving hole 28 for holding a vial set by the user. The vial receiving hole 30 is provided corresponding to size of each type of vial to receive each type of vial supplied from the sampler 4. In the example of FIG. 4, three vial receiving holes 30S for receiving a small-sized vial and one vial receiving hole 30L for receiving a large-sized vial are provided. An edge of each of the vial receiving holes 30 has a tapered shape, and when a vial is supplied from the sampler 4 to the injector 2, so that slightly displaced positioning of the transfer arm 14 with respect to each of the vial receiving holes 30 is allowed.

Figure 5:
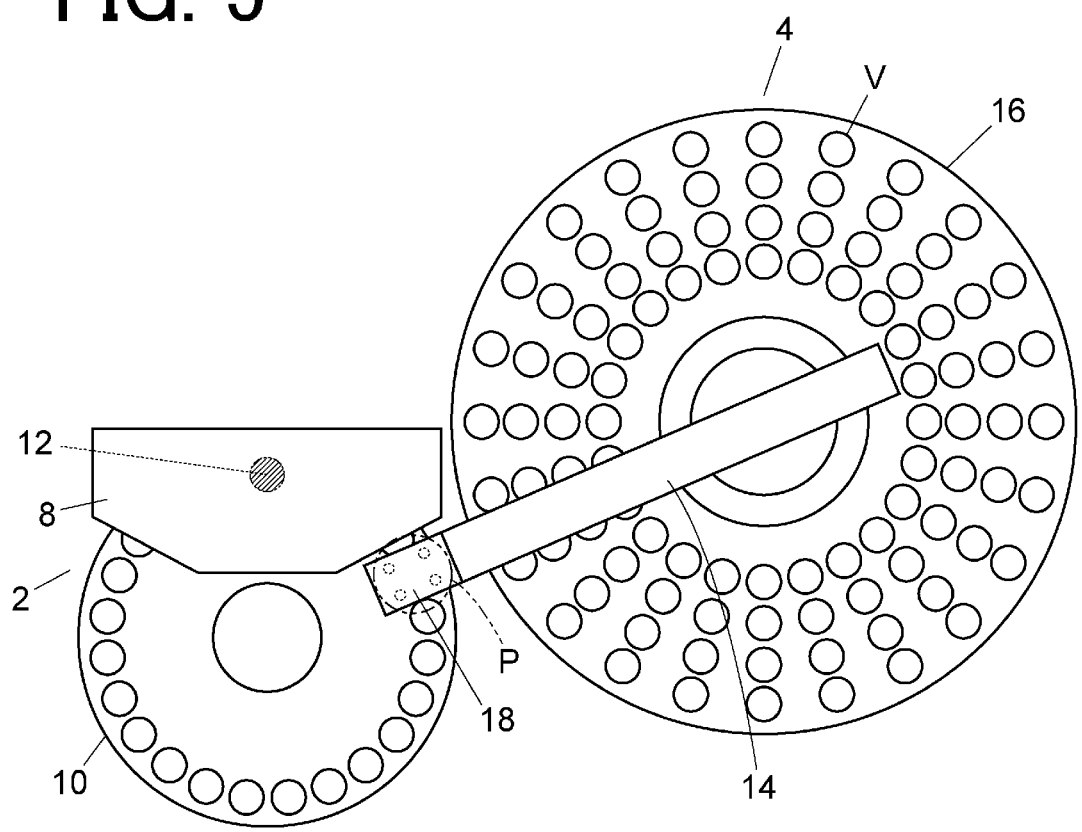
FIG. 5 is a diagram illustrating a state when a vial is supplied from a sampler to an injector in the embodiment.

As illustrated in FIG. 5, a delivery position P for delivering a vial between the injector 2 and the sampler 4 is set on a circumferential track drawn by each of the vial receiving holes 30 as the turret 10 rotates. The delivery position P is set at the time of teaching performed at the time of installation of the automatic sample injection system 1 or the like, and the controller 22 of the injector 2 and the controller 24 of the sampler 4 store position coordinates of the delivery position P. When a vial is supplied from the sampler 4 to the injector 2, the controller 24 of the sampler 4 provides the sampler 4 with size information of the vial to be supplied recognized by the controller 24 via the management device 6. Based on the provided size information of the vial, the controller 22 of the injector 2 controls the turret 10 so that the vial receiving hole 30 corresponding to the vial is located at the delivery position P. For example, in a case where the vial to be supplied is a small-sized vial, any one of the vial receiving holes 30S that are vacant (in which no vial is set yet) among the vial receiving holes 30S for small-sized vials is arranged at the delivery position P. When there are a plurality of the vial receiving holes 30S that are vacant, which one of the vial receiving holes 30S is to be arranged at the delivery position P can be determined based on a preset priority order.

Here, the controller 22 is provided with a vial detector 26 configured to detect the presence or absence of a vial in each of the vial receiving holes 30 (see FIG. 2). The vial detector 26 is a function realized by a CPU executing a predetermined program. Whether a vial is already set in each of the vial receiving holes 30 can be detected by referring to a history of delivery of the vial V between the injector 2 and the sampler 4. When detecting that there is no vacant one in the vial receiving holes 30 corresponding to a vial to be supplied, the vial detector 26 outputs a signal indicating that there is no vacant one in the vial receiving holes 30 to the management device 6. The management device 6 transmits an instruction to the controller 24 of the sampler 4 to cancel the supply of the vial, so that the supply of the vial to be performed is canceled.

An example of operation related to supply of a vial from the sampler 4 to the injector 2 will be described with reference to the flowchart of FIG. 6 together with FIGS. 1 and 2.

For example, at a timing to supply a vial from the sampler 4 to the injector 2 in a preset sequence, the management device 6 transmits a supply instruction for a desired vial (target vial) to the controller 24 of the sampler 4. The controller 24 of the sampler 4 provides size information of the target vial to be supplied to the controller 22 of the injector 2 via the management device 6. The controller 22 of the injector 2 recognizes size of the target vial based on the provided information (Step 101), and detects the presence or absence of a vial in the vial receiving hole 30 corresponding to the target vial (Step 102).

In a case where the vial receiving hole 30 corresponding to the target vial is vacant (Step 103: Yes), the controller 22 of the injector 2 controls the turret 10 to arrange the vial receiving hole 30 corresponding to the target vial at the delivery position P (Step 104). The controller 24 of the sampler 4 controls the transfer arm 14, carries the target vial to the delivery position P, and delivers the target vial to the vial receiving hole 30 arranged at the delivery position P (Step 105).

In contrast, in a case where the vial receiving hole 30 corresponding to the target vial is not vacant (Step 103: No), the sampler 4 cancels the supply of the target vial to the injector 2 (Step 106). At this time, the management device 6 may be configured to display information indicating that the supply of the target vial is canceled on an information display device (not illustrated) such as a liquid crystal display.

The embodiment described above is merely an example of an embodiment of the automatic sample injection system according to the present invention. An embodiment of the automatic sample injection system according to the present invention is as described below.

One embodiment of the automatic sample injection system according to the present invention includes at least an injector that performs sample injection operation to an analysis device. The injector includes a turret comprising a plurality of vial receiving holes that are corresponding to a plurality of types of vials having different sizes and are for receiving the plurality of types of vials, the plurality of vial receiving holes being provided on a same circumference on an upper surface of the turret, the turret being configured to rotate so that the plurality of vial receiving holes are each moved along a circumferential track, and a controller that controls operation of the turret, the controller being configured, in a case where a sampler for supplying a vial to the injector is provided, to recognize a size of a target vial to be supplied at the time when the target vial is supplied from the sampler to the injector and to arrange the vial receiving hole corresponding to the target vial at a delivery position set on the circumferential track.

A first aspect of the embodiment further includes a sampler arranged on the side of the injector to supply a vial to the injector. The sampler is configured to output a vial information regarding a size of the target vial to be supplied and to carry the target vial to the delivery position when supplying the target vial to the injector, and the controller of the injector is configured to recognize the size of the target vial based on the vial information output from the sampler and to arrange the vial receiving hole corresponding to the target vial at the delivery position.

In a second aspect of the embodiment, the injector further includes a vial detector configured to detect, before the target vial is supplied from the sampler to the injector, whether or not the vial receiving hole corresponding to the target vial is vacant. According to such an aspect, it is possible to detect whether or not there is vacancy in the vial receiving hole for receiving a vial before the vial is carried from the sampler to the injector, and it is possible to prevent the vial from being supplied from the sampler in a state where there is no vacancy in the vial receiving hole on the injector side. This second aspect can be combined with the first aspect.

In the second aspect, the sampler can be configured to cancel supply of the target vial to the injector in a case where the vial detector detects that the vial receiving hole corresponding to the vial to be supplied is not vacant. In this manner, it is possible to reliably prevent a vial from being supplied from the sampler in a state where there is no vacancy in the vial receiving hole on the injector side.

In a third aspect of the embodiment, the vial receiving holes have edges that are tapered shape. In this manner, it is possible to allow displacement in positioning of a vial with respect to the vial receiving hole when the vial is supplied from the sampler to the injector to some extent.

DESCRIPTION OF REFERENCE SIGNS 1 automatic sample injection system
2 injector
4 sampler
6 management device
8 sampling mechanism
10 turret
12 syringe
14 transfer arm
16 vial holder
18 gripper
20 claw
22 controller of injector
24 controller of sampler
26 vial detector
28, 30 vial receiving hole

What is claimed is:

1. An automatic sample injection system comprising at least an injector that performs sample injection to an analysis device, wherein
the injector includes
a turret comprising a plurality of vial receiving holes that are corresponding to a plurality of types of vials having sizes from each other and are for receiving the plurality of types of vials, the plurality of vial receiving holes being provided on a same circumference on an upper surface of the turret, the turret being configured to rotate so that the plurality of vial receiving holes are each moved along a circumferential track, and
a controller that controls operation of the turret, the controller being configured, in a case where a sampler for supplying a vial to the injector is provided, to recognize a size of a target vial to be supplied at the time when the target vial is supplied from the sampler to the injector and to arrange the vial receiving hole corresponding to the target vial at a delivery position set on the circumferential track.

2. The automatic sample injection system according to claim 1, further comprising:
a sampler arranged on a side of the injector to supply a vial to the injector, wherein
the sampler is configured to output a vial information regarding a size of the target vial to be supplied and to carry the target vial to the delivery position when supplying the target vial to the injector, and
the controller of the injector is configured to recognize the size of the target vial based on the vial information output from the sampler and to arrange the vial receiving hole corresponding to the target vial at the delivery position.

3. The automatic sample injection system according to claim 1, wherein the injector further includes a vial detector configured to detect, before the target vial is supplied from the sampler to the injector, whether or not the vial receiving hole corresponding to the target vial is vacant.

4. The automatic sample injection system according to claim 3, wherein the sampler is configured to cancel supply of the target vial to the injector in a case where the vial detector detects that the vial receiving hole corresponding to the vial to be supplied is not vacant.

5. The automatic sample injection system according to claim 1, wherein the vial receiving holes have edges that are tapered shape.

* * * * *